E. MORGAN.
Hand-Seeder.

No 12,256. Patented Jan 16. 1855.

UNITED STATES PATENT OFFICE.

ELIJAH MORGAN, OF MORGANTOWN, VIRGINIA.

IMPROVEMENT IN SEED-PLANTERS.

Specification forming part of Letters Patent No. 12,256, dated January 16, 1855.

*To all whom it may concern:*

Be it known that I, ELIJAH MORGAN, of Morgantown, in the county of Monongalia and State of Virginia, have invented certain new and useful Improvements in Seeding-Machines; and I do hereby declare that the following is a clear and exact description of the same, reference being had to the annexed drawings, making a part of this description, in which—

Figure 1:
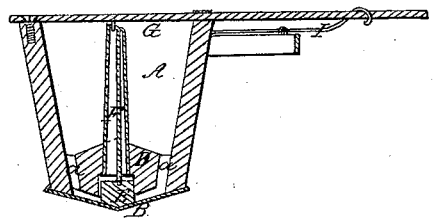
Figure 2:
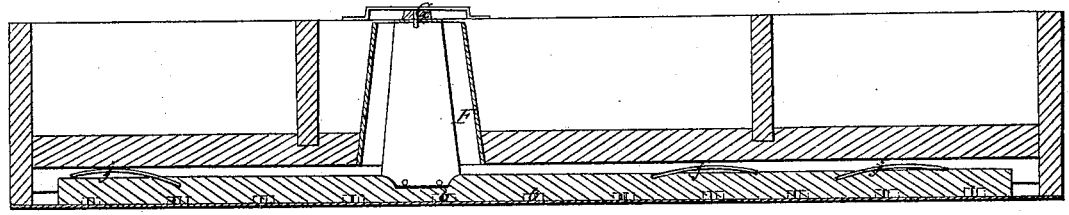
Figure 3:
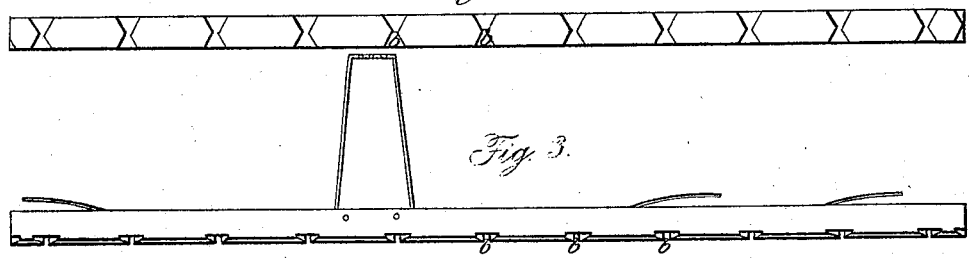
Figure 4:
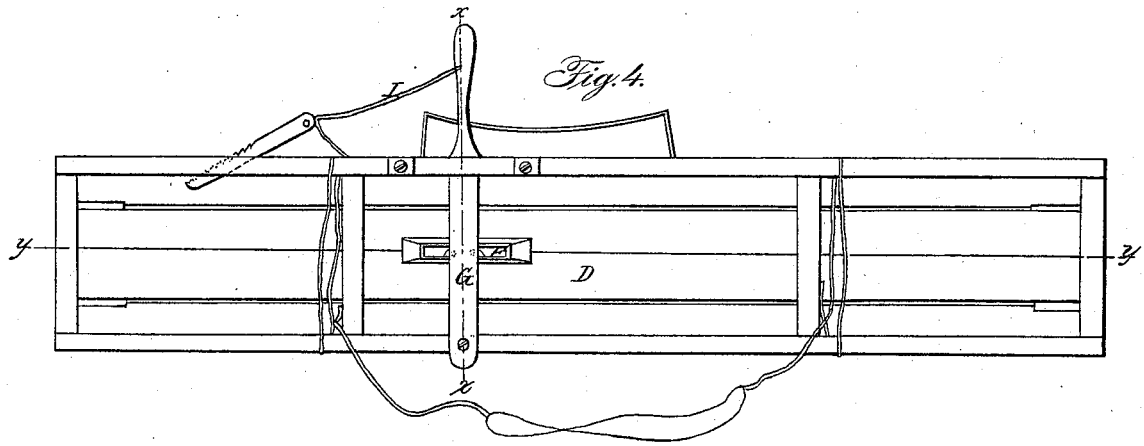
Figure 5:
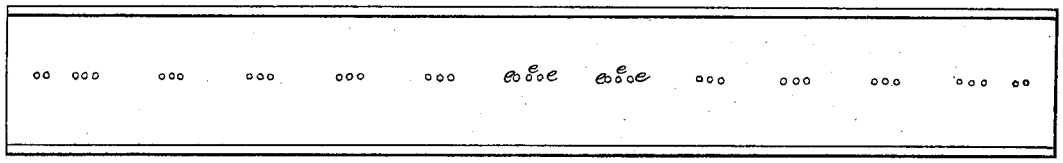

Figure 1 is a cross-section taken in the line *x x*, Fig. 4. Fig. 2 is a side elevation in section through the line *y y*, Fig. 4. Figs. 3, 3' are detached views of the reciprocating feed-bar. Fig. 4 is a plan view. Fig. 5 is a detached view of bottom plate of the hopper.

Like letters refer to like parts in the different figures.

The nature of my invention consists in constructing an apparatus for the purpose of sowing grass, clover, and other seeds of a similar nature which require a great amount of accuracy in the machinery to enable it to distribute the seed evenly over the ground.

My invention relates more particularly to the combination of the reciprocating bar with the protecting-bar, which shields the said reciprocating bar from the weight of the seed, which would press down upon the bar and destroy the operation of it. It also relates to the V-shaped bottom of the box and of the reciprocating bar; also to the peculiar arrangement of the recesses in the reciprocating bar.

To enable others skilled in the art to make and use my invention, I will proceed to describe its construction and operation.

I construct a hopper, A, of a suitable length and size to hold a quantity of seed and secure a V-shaped bottom to it, (see B, Fig. 1.)

D is a bar, which is fitted into the bottom of the hopper, as seen in Fig. 1, so to form recesses *a* between its sides and the sides of the hopper. Bar D is grooved on the under side, so as to admit the reciprocating bar E, which slides in the groove freely.

E is the reciprocating feed-bar, the lower edge of which is V-shaped and fits nicely to the bottom. (See Fig. 1.) This bar is small and straight, and works freely in the groove, as before described. The under surface of the bar is provided with a series of recesses, *b*, which are intended to allow the seed to pass out of the box through small apertures in the bottom of the hopper. (See Fig. 5.) These apertures are marked *c*, and there are three in number to every recess *b* in bar E. Bar E is provided with a stem or projection which passes through an opening and a trunk, F, and is connected to a vibrating bar, G, which may be operated by any proper means, but in portable machines it is to be operated by the hand. In the top of projection H there are three small holes, which correspond to the apertures in the bottom of the hopper. These apertures receive a pin on the under side of the bar G, and thus secure them together by changing the pin to different holes, and by regulating the cord I the amount of seed may be regulated. The cord I is connected by one of its ends to the lever G and by the other end to a rack or toothed bar, K, which passes through an oblong slot in the hopper. A pin is let through the side of the hopper, against which the teeth in the bar K catch and hold, so that the throw or vibration of the lever G may be adjusted at any time, and by means of said lever the spaces *b* may traverse past or across one, two, or three holes, and thus regulate the quantity of seed sown.

This machine may be mounted on wheels, or it may be carried by the operator by suspending it in front of his body by means of straps, &c.

There are several advantages presented in this machine, the first of which is the use of the protecting-bar, which cannot be dispensed with, as it supports the weight of the seed and allows the reciprocating bar to act without any obstruction. If the protecting-bar should be removed, the machine could not operate. Second, the V-shaped bottom and the peculiar arrangement of the apertures and their shape greatly facilitate the operation of the machine in distributing the seed in a uniform manner over the ground.

*j j j* are springs, which are attached to the reciprocating bar and act to keep said bar down snugly to the bottom of the hopper.

What I claim as my invention, and desire to secure by Letters Patent, is—

1. The combination of the stationary protecting-bar and the reciprocating feed-bar, when the latter operates within a groove in the former, substantially in the manner described.

2. The combination of the V-shaped forms of the bottom of the hopper and the bottom of the reciprocating bar, when said bar is provided with openings from both sides, which meet and vibrate over the holes $c$ in the bottom of the hopper, substantially as described, and for the purpose set forth.

E. MORGAN. [L. S.]

Witnesses:
A. E. BRUMAGE,
H. D. MCGEORGE.